United States Patent
Anand et al.

(10) Patent No.: US 7,287,127 B2
(45) Date of Patent: Oct. 23, 2007

(54) ADAPTIVE SCHEDULER USING INHERENT KNOWLEDGE OF OPERATING SYSTEM SUBSYSTEMS FOR MANAGING RESOURCES IN A DATA PROCESSING SYSTEM

(75) Inventors: Vaijayanthimala K. Anand, Austin, TX (US); Sandra K. Johnson, Austin, TX (US); Ananda Krishnan Venkataraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 10/912,495

(22) Filed: Aug. 5, 2004

(65) Prior Publication Data

US 2006/0031841 A1    Feb. 9, 2006

(51) Int. Cl.
*G06F 12/00* (2006.01)
*G06F 15/167* (2006.01)
*G06F 9/46* (2006.01)

(52) U.S. Cl. ............... 711/147; 711/170; 709/213; 709/226; 709/229; 710/6; 718/104

(58) Field of Classification Search ............... 709/213, 709/220, 226, 229; 710/6; 711/147, 170; 718/104
See application file for complete search history.

(56) References Cited

U.S. PATENT DOCUMENTS

2005/0071843 A1*   3/2005  Guo et al. ............... 718/101
2006/0259709 A1*  11/2006  Uchiumi et al. ............ 711/147

* cited by examiner

*Primary Examiner*—Jack Lane
(74) *Attorney, Agent, or Firm*—Duke W. Yee; Diana R. Gerhardt; Gerald H. Glanzman

(57) ABSTRACT

Method, system and computer program product for managing resources in a data processing system. Knowledge provided by each subsystem of a plurality of subsystems of an operating system regarding behavior of the subsystem is shared by other subsystems of the operating system, and the shared knowledge, together with existing functional characteristics of the subsystems is used by the operating system to more efficiently manage resources in the data processing system.

14 Claims, 3 Drawing Sheets

ADAPTIVE SCHEDULER USING INHERENT KNOWLEDGE OF OPERATING SYSTEM SUBSYSTEMS FOR MANAGING RESOURCES IN A DATA PROCESSING SYSTEM

TECHNICAL FIELD

The present invention relates generally to the data processing field and, more particularly, to a method, system and computer program product for managing resources in a data processing system.

DESCRIPTION OF RELATED ART

The various subsystems of a modern operating system (OS), for example, scheduler, input/output (I/O) subsystem, memory management subsystem, process management subsystem, inter-process management subsystem, synchronization infrastructure, etc., operate both independently and cooperatively during processes of managing resources of a data processing system. Recent enhancements to improve the efficiency of resource management include fine-grained resource partitioning and support for classes of work assigned with different qualities of service (QoS), Fairshare Scheduler and the like. In general, these enhancements seek to improve resource management efficiency by more efficiently managing the workload of the operating system.

In particular, workload management enhancements provide the operating system with "clues" so that the operating system will give preferential treatment to different categories or classes defined by a user. These enhancements generally help the operating system in scheduling applications and users, but are not directed to enhancing the resource management processes themselves.

Issues encountered in multimedia applications and in other applications in real-time operating system environments have led to a number of studies directed to improving the management of data processing system resources. Some of these studies have led to the concept of applications providing "hints" to the scheduler to assist the scheduler in scheduling applications. For example, the relationship between tasks in a multimedia application can be used by the scheduler to schedule tasks in a particular sequence to fully process a single picture frame. However, none of the scheduling algorithms consider the use of heuristics or other data that can be collected by the OS subsystems during execution of an application to provide hints to the scheduler to enable the scheduler to schedule tasks more efficiently.

Studies have also been conducted on extensible operating systems where applications modify kernel behavior by providing mechanisms for application code to run in the kernel address space. This procedure enables applications to modify the kernel to improve application performance. The internal workings of the kernel and knowledge accrued from various kernel subsystems are used to extend the kernel behavior to improve performance.

In this context of extensible operating systems, studies have been also been conducted to determine which parts of the operating system to extend, based on self-monitoring by the operating system and self-adapting techniques. This procedure is generally similar to the workload management procedures described above.

Yet other studies have addressed the issue of minimizing the end-to-end latency of applications that are structured as a set of cooperating (real-time) tasks. In this approach, the scheduler is provided with information on the inter-process communication interconnections between tasks of the applications, and uses this information to guarantee an end-to-end latency for applications that is a function of the timing properties of the application, not kernel subsystem knowledge.

In general, although existing operating systems may build heuristics to incorporate some of the information that OS subsystems accrue during the course of executing applications, store the information and then use the information to some extent, the information is only used in the same subsystem that gathered the information.

It would, accordingly be advantageous to provide a procedure for managing resources in a data processing system in which knowledge provided by each subsystem of a plurality of subsystems of an operating system regarding behavior of the subsystem is shared with other subsystems of the operating system, and used by the operating system to efficiently manage resources in the data processing system.

SUMMARY OF THE INVENTION

The present invention provides a method, system and computer program product for managing resources in a data processing system. Knowledge provided by each subsystem of a plurality of subsystems of an operating system regarding behavior of the subsystem is shared with other subsystems of the operating system, and the shared knowledge, together with existing functional characteristics of the subsystems is used by the operating system to more efficiently manage resources in the data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
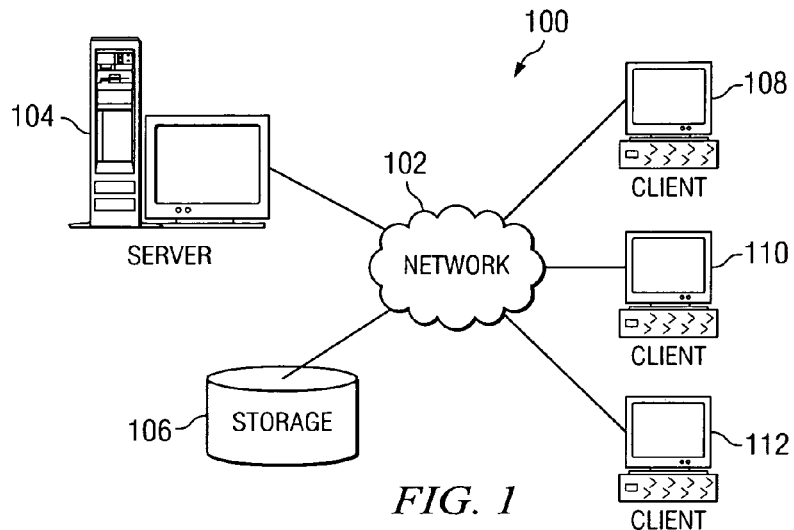
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
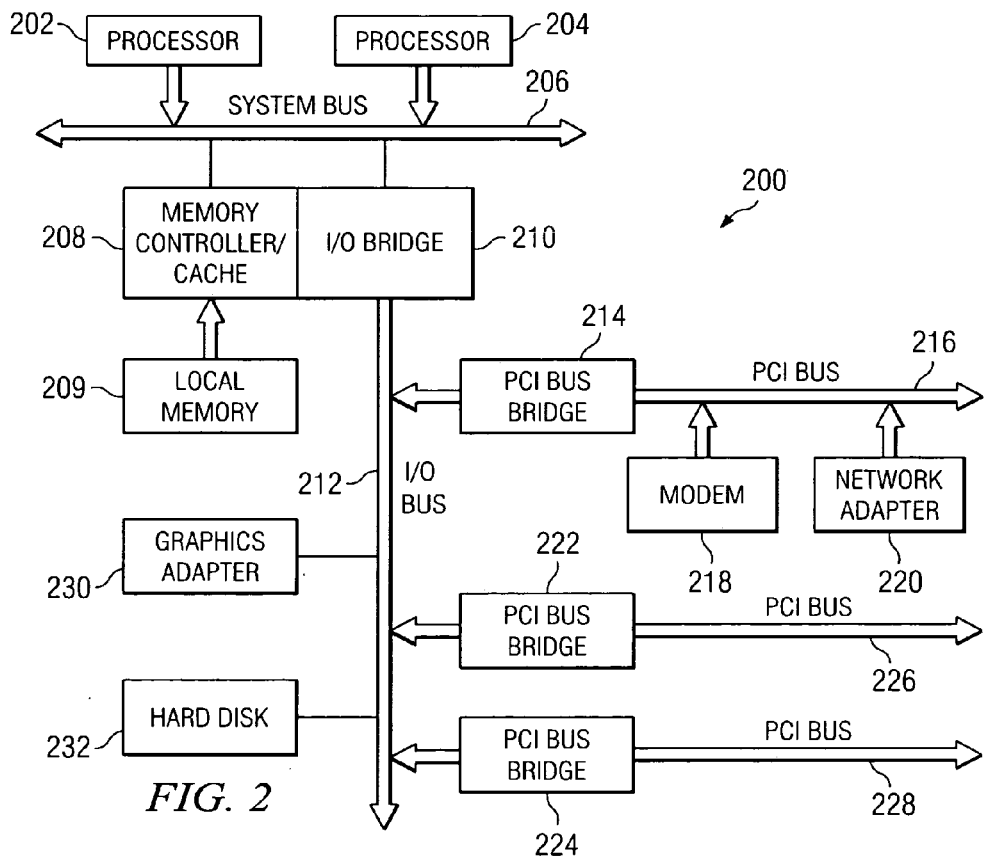
FIG. 2 is a block diagram of a data processing system that may be implemented as a server in the network of data processing systems of FIG. 1.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
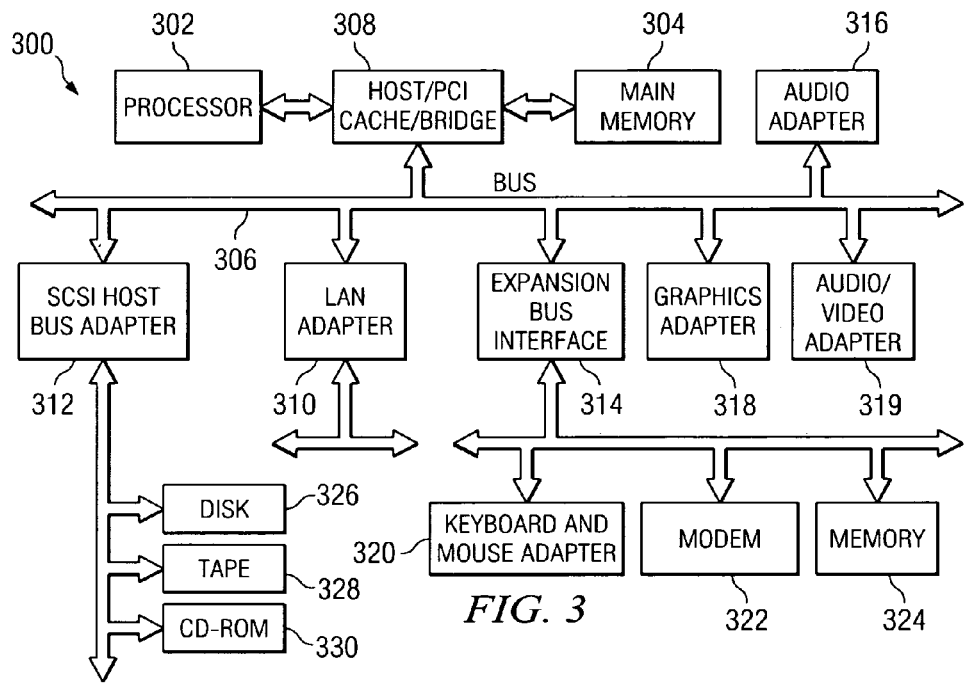
FIG. 3 is a block diagram of a data processing system that may be implemented as a client in the network of data processing systems of FIG. 1.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a technique for managing resources in a data processing system that utilizes inherent knowledge acquired by subsystems of an operating system during operation of the operating system (heuristic knowledge), together with existing functional characteristics of the subsystems. More particularly, an operating system of a data processing system efficiently manages resources in a data processing system by:
1. acquiring and storing knowledge about the behavior of each of a plurality of subsystems of the operating system,
2. sharing the acquired knowledge about the behavior of each of the plurality of subsystems with other subsystems of the plurality of subsystems, and
3. using the shared knowledge along with functional characteristics of the plurality of subsystems to efficiently manage data processing system resources.

Figure 4:
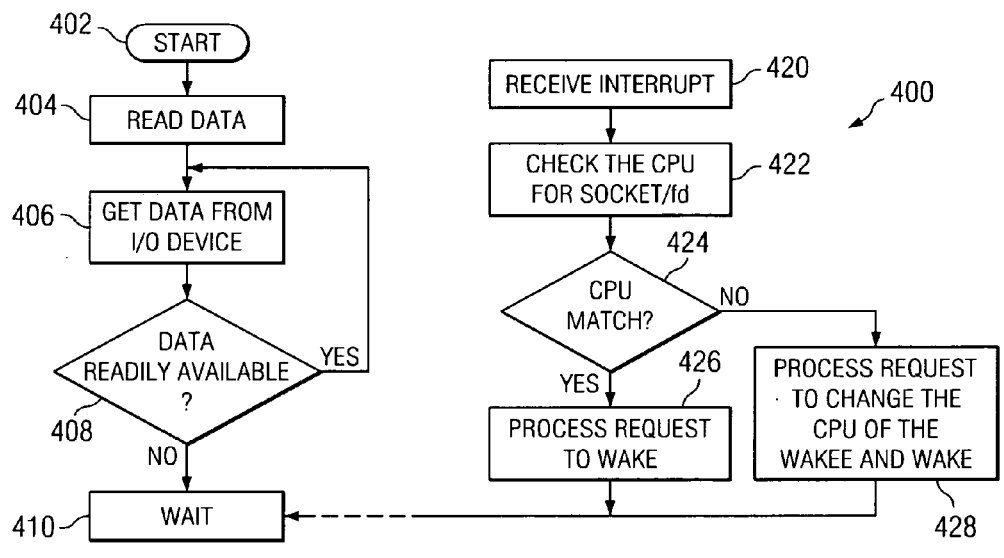
FIG. 4 is a flowchart that illustrates a method for managing resources in a data processing system in accordance with a preferred embodiment of the present invention.

FIG. 4 is a flowchart that illustrates a method for managing resources in a data processing system in accordance with a preferred embodiment of the present invention. The method relates to managing resources in a data processing system by utilizing inherent knowledge involving hard disk or network input/output (I/O) subsystems of an operating system of the data processing system to assist a scheduler in scheduling tasks. The inherent knowledge includes knowledge that any data operations (read or write) will eventually access external I/O devices, which leads to a waiting state for the operations (tasks), and inherent knowledge that the fulfillment of I/O requests is driven by interrupts. This inherent knowledge about the hard disk or network or any I/O subsystems is used to improve the efficiency of managing resources in a multiprocessor data processing system in which the CPU (Central Processing Unit) that processes the interrupt is different than the CPU where the task is waiting for data. In particular, by utilizing the inherent information, the scheduler may try to schedule the two tasks on the same CPU. This will improve the memory latency as the data is already loaded into the CPU where the data is processed first (part of the interrupt processing).

The method illustrated in FIG. 4 is generally designated by reference number 400, and includes both the process context and the interrupt context of the method. The process context starts by the OS creating a task and assigning a particular CPU to run the task (step 402). A read data instruction is then issued (step 404) instructing to obtain data from an I/O device (step 406). Create an association between the socket of the network connection and the CPU where the connection originated. This knowledge is used by the interrupt subsystem while routing the interrupts to CPUs. A determination is then made whether the data is readily available (step 408). If the data is readily available (Yes output of step 408), the data is obtained from the network interface (step 406). If the data is not readily available (No output of step 408), the task is put into a wait queue (step 410) to wait for the data to be available. A flag (WAIT_FOR_DATA) is set in the task structure indicating that the task is waiting for a prior task to complete to receive the data.

In the interrupt context, an interrupt is received (step 420), and the CPU is checked for socket association (step 422). A determination is then made if there is a CPU match, that is, the CPU where the interrupt was processed is the same CPU where the socket is associated (step 424). If there is a match (Yes output of step 424), a process to wake-up the waiting task is processed (step 426). If there is not a CPU match (No output of step 424), a request to change the CPU of the wakee and to wake-up the waiting task is processed (step 428). During the wake-up, the scheduler checks the flag (WAIT_FOR_DATA) to see if the task is waiting for data. The scheduler then schedules the waiting task on the same CPU as the wakee (the caller of the wakeup). This is because the wakee most likely processed the I/O to completion. The WAIT_FOR_FLAG is then reset to assure that the data processed by the wakee is already in the computer cache so when the waiting task is woken up, the data does not have to be fetched again.

Figure 5:
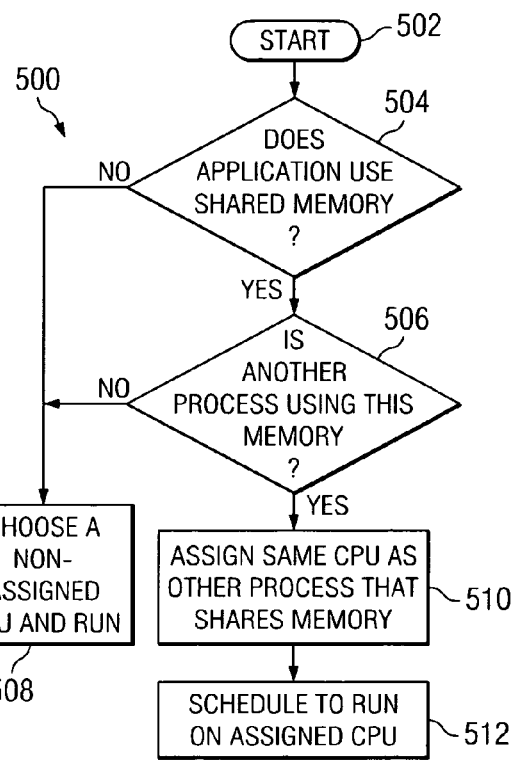
FIG. 5 is a flowchart that illustrates a method for managing resources in a data processing system in accordance with a further preferred embodiment of the present invention.

FIG. 5 is a flowchart that illustrates a method for managing resources in a data processing system in accordance with a further preferred embodiment of the present invention. The method relates to a situation in which different applications share a common memory area. The memory management subsystem of the operating system is aware of this situation (inherent knowledge), and the scheduler uses this information to try to schedule the related tasks on the same CPU to reduce memory latency.

The method illustrated in FIG. 5 is generally designated by reference number 500 and, after starting (step 502), a determination is made if an application uses a shared memory with another application (step 504). If not, (No output of step 504), the OS chooses a CPU that is not assigned to run the application (step 508). The determination as to whether an application shares a memory with another application utilizes inherent knowledge of a memory manager subsystem that stores the name of the shared memory, i.e., "mem/game/seg", in the task structure of the task that allocated or tried to share the memory. In addition, the address of the tasks that share this memory are stored in the task structure in a doubly linked list. For example, if three tasks tried to share the same memory, then the three associated task structures will have the shared segment name.

If the determination of step 504 is in the affirmative (Yes output of step 504), a determination is made if another process is using the same memory (step 506). If not, (No output of step 506), a CPU is chosen that is not assigned and the process is run (step 508). If another process is using the memory (Yes output of step 506), the process is assigned the same CPU as the other process that shares the memory (step 510). The determination of whether another process is using the same memory is made by checking the list that lists all processes that share the same memory.

After the process has been assigned to the same CPU in step 510, the scheduler schedules the process to run on the assigned CPU (step 512) and the method ends.

Figure 6:
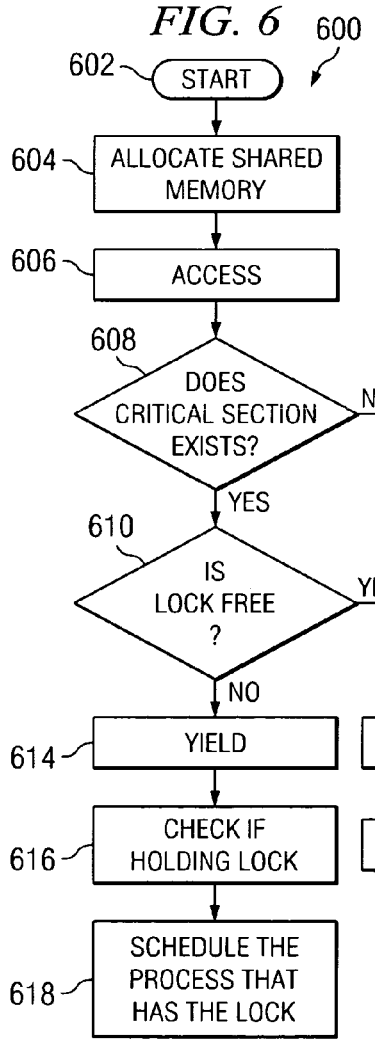
FIG. 6 is a flowchart that illustrates a method for managing resources in a data processing system in accordance with yet a further preferred embodiment of the present invention.

FIG. 6 is a flowchart that illustrates a method for improving efficiency of workload management in accordance with another preferred embodiment of the present invention. FIG. 6 relates to a situation where three tasks that share the same memory area try to serialize access to a piece of memory in the shared area, and cause a contention. In particular, if there is a critical section in the shared memory area, the scheduler may choose to schedule the contending tasks in sequence. In this case, the scheduler needs to work with a synchronization subsystem of the operating system to use the synchronization subsystem's knowledge of resource contention of the tasks. This will enable other runnable tasks that do not have contention to use the CPU cycles.

The method illustrated in FIG. 6 is generally designated by reference number 600, and, after starting (step 602), allocates a shared segment of memory to be shared by a plurality of applications (step 604). The memory manager stores the name of the shared memory, i.e., "mem/game/seg", in the task structure of the task that allocated or tried to share the memory. In addition, the address of the tasks that share this memory are stored in the task structure in a doubly linked list. For example, if the three tasks try to share this memory, then the three associated task structures will have the shared segment name.

If the three tasks try to serialize access to a piece of memory in this shared segment that will cause contention. This contention can be recorded or stored in the task structure with a wait state token, along with the shared memory name. That is, "critical_selection_wait" can be set in the task structure. However, there are cases where tasks might try to use try_to_get to get the lock. If the attempt fails, the task might use yield or other mechanisms instead of going to the wait state as part of the contention. In such cases, a "yield_wait_for_shared_mem" flag can be set in the task structure. The scheduler, having known that the task is yielding because it is waiting for a resource, can defer scheduling that task if the owning task has not released the lock. This is because the scheduler can quickly traverse the links to see if the lock is released.

In particular, when an application seeks access to the memory segment (step 606), a determination is made if a critical section exists (step 608). If no (No output of step 608), access is granted (step 620). If Yes (Yes output of step 608), a determination is made if the lock is free (step 610). If the lock is free (Yes output of step 610), the lock is acquired (step 612), and access is granted (step 620). If the lock is not free (No output of step 610), the application uses a yield mechanism to try to gain access instead of going into a wait state (step 614). If so, a check is conducted to see if it is holding the lock (step 616).

The determination of whether an application is holding a lock involves checking the list of tasks that share the memory segment, checking the list of tasks from the list waiting for the lock, and based on the checks, applying the appropriate yield policy. The process is then scheduled based on its lock priority (step 618), and the method ends.

The present invention can also be used in numerous other situations to manage resources in a data processing system. For example, the invention can be used where tasks that are running within an operating system have a relational dependency, i.e., one task is waiting for another task to be completed. This inherent knowledge can be derived using an inter-process communication subsystem of the operating system. For example, when a task A must wait for a task B to be completed, the scheduler can schedule task A first and then task B may be on the same CPU in a multiprocessor system.

The present invention thus provides a technique for managing resources in a data processing system in which knowledge provided by each subsystem of a plurality of subsystems of an operating system regarding behavior of the subsystem is shared with other subsystems of the operating system, and the shared knowledge is used by the operating system to more efficiently manage resources in the data processing system. The technique in accordance with the present invention can be used alone or in conjunction with other efficiency enhancing techniques, such as workload management enhancement techniques, to more efficiently manage resources of the data processing system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A method for managing resources in a multiprocessor data processing system, comprising:

acquiring knowledge about the behavior of each of a plurality of subsystems of an operating system in the data processing system, wherein the plurality of subsystems includes a scheduler and a memory manager subsystem;

storing the acquired knowledge in memory;

sharing the acquired knowledge among the plurality of subsystems of the operating system; and using the shared knowledge to manage resources in the multiprocessor data processing systems wherein the scheduler uses knowledge provided by the memory manager subsystem to schedule a plurality of applications that share a same memory area in a same central processing unit of the multiprocessor data processing system.

2. The method according to claim 1, wherein acquiring knowledge includes acquiring the knowledge in a kernel while executing applications.

3. The method according to claim 1, wherein using the shared knowledge includes using the shared knowledge and functional information about the plurality of subsystems to manage resources in the data processing system.

4. The method according to claim 1, wherein the plurality of subsystems includes a scheduler, an input/output subsystem, an interrupt processing system and a process management subsystem, and wherein the scheduler uses knowledge provided by the input/output subsystem, the interrupt processing subsystem and the process management subsystem to schedule a plurality of tasks on a same central processing unit to improve memory latency.

5. The method according to claim 1, wherein the plurality of subsystems includes a scheduler and a synchronization subsystem, and wherein the scheduler uses knowledge provided by the synchronization subsystem to schedule contending tasks in a serialized manner.

6. A system for managing resources in a multiprocessor data processing system, comprising:

an operating system, the operating system including:

a plurality of subsystems, each of the plurality of subsystems acquiring knowledge about the behavior of each of a plurality of subsystems of an operating system in the data processing system, wherein the plurality of subsystems includes a scheduler and a memory manager subsystem;

storing the acquired knowledge in memory;

sharing the acquired knowledge among the plurality of subsystems of the operating system; and using the shared knowledge to manage resources in the multiprocessor data processing system, wherein the scheduler uses knowledge provided by the memory manager subsystem to schedule a plurality of applications that share a same memory area in a same central processing unit of the multiprocessor data processing system.

7. The system according to claim 6, wherein the means for using includes means for using the shared knowledge and functional information about the plurality of subsystems to manage resources in the data processing system.

8. The system according to claim 6, wherein the resources include memory resources.

9. The system according to claim 6, wherein the resources includes input/output adapter resources.

10. A computer program product in a recordable-type computer medium for managing resources in a multiprocessor data processing system, comprising:

first instructions for acquiring knowledge about the behavior of each of a plurality of subsystems of an operating system in the data processing system, wherein the plurality of subsystems includes a scheduler and a memory manager subsystem;

second instructions for storing the acquired knowledge in memory:

third instructions for sharing the knowledge among the plurality of subsystems of the operating system; and fourth instructions for using the shared knowledge to manage resources in the multiprocessor data processing system, wherein the scheduler uses knowledge provided by the memory manager subsystem to schedule a plurality of applications that share a same memory area in a same central processing unit of the multiprocessor data processing system.

11. The computer program product according to claim 10, wherein the first instructions includes instructions for acquiring the knowledge in a kernel while executing applications.

12. The computer program product according to claim 10, wherein the fourth instructions includes instructions for using the shared knowledge and functional information about the plurality of subsystems to manage resources in the data processing system.

13. The computer program product according to claim 10, wherein the plurality of subsystems includes a scheduler, an input/output subsystem, an interrupt processing subsystem and a process management subsystem, and wherein the third instructions includes instructions for the scheduler to use knowledge provided by the input/output subsystem, the interrupt processing subsystem and the process management subsystem to schedule a plurality of tasks on a same central processing unit to improve memory latency.

14. The computer program product according to claim 10, wherein the plurality of subsystems includes a scheduler and a synchronization subsystem, and wherein the fourth instructions includes instructions for the scheduler to use knowledge provided by the synchronization subsystem to schedule contending tasks in a serialized manner.

* * * * *